Figure 1:
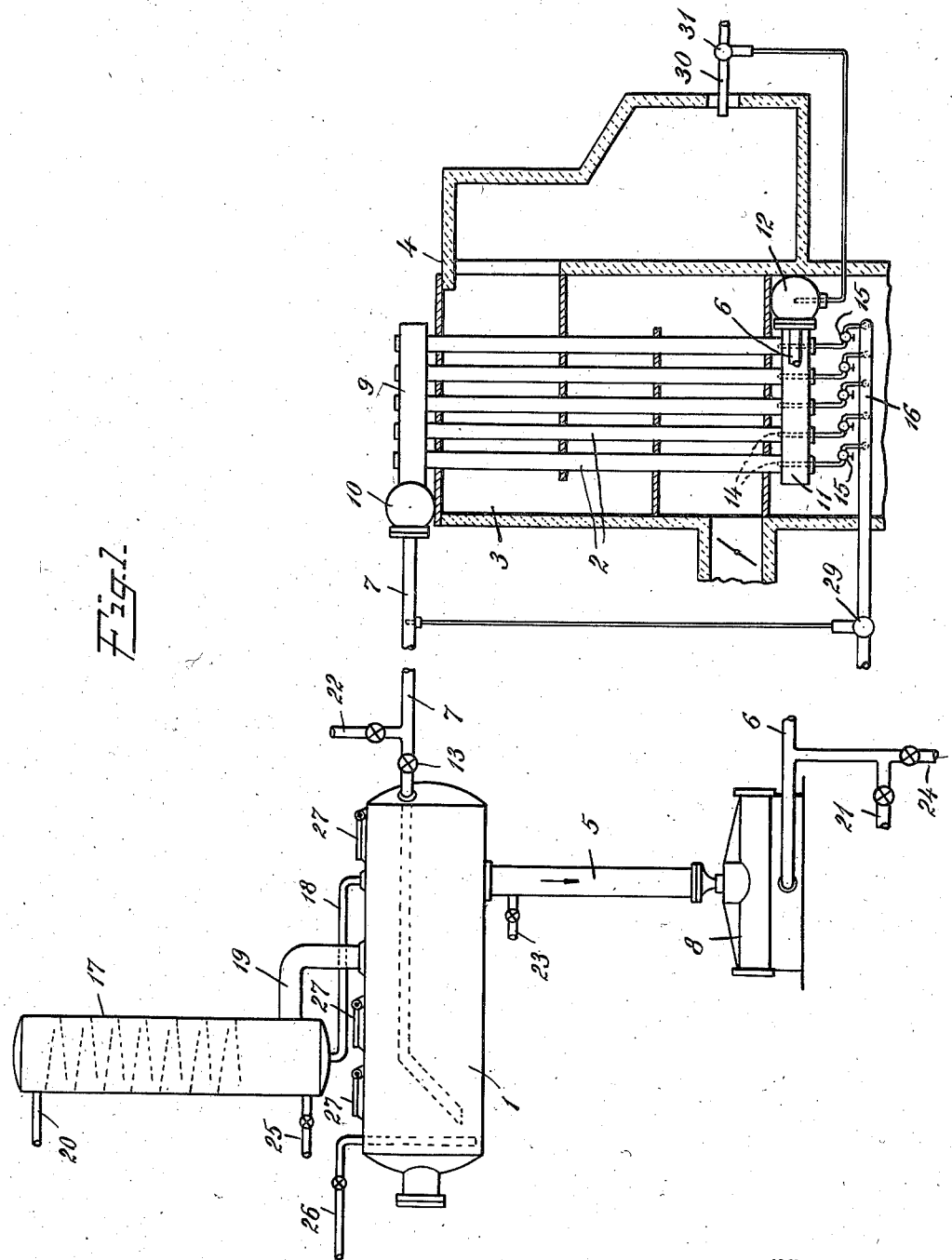

Oct. 13, 1936.　　H. I. RINGGENBERG　　2,057,265
ASPHALT MANUFACTURE
Filed Dec. 14, 1935　　3 Sheets-Sheet 1

INVENTOR
Herman I. Ringgenberg
BY
ATTORNEYS

Oct. 13, 1936.  H. I. RINGGENBERG  2,057,265
ASPHALT MANUFACTURE
Filed Dec. 14, 1935  3 Sheets-Sheet 2

INVENTOR
Herman I. Ringgenberg
BY
Pennie, Davis, Marvin & Edmonds
ATTORNEYS

Oct. 13, 1936.  H. I. RINGGENBERG  2,057,265
ASPHALT MANUFACTURE
Filed Dec. 14, 1935    3 Sheets-Sheet 3

INVENTOR
Herman I. Ringgenberg
BY
Pennie, Davis, Marvin & Edmonds
ATTORNEYS

Patented Oct. 13, 1936

2,057,265

UNITED STATES PATENT OFFICE 2,057,265

ASPHALT MANUFACTURE

Herman I. Ringgenberg, Munster, Ind., assignor to Sinclair Refining Company, New York, N. Y., a corporation of Maine Application December 14, 1935, Serial No. 54,457

5 Claims. (Cl. 196—74)

This invention relates to improvements in the manufacture of asphalt from petroleum residuums. More particularly, the invention involves improvements in method and apparatus for the manufacture of asphalt of that general type wherein a petroleum residuum, as such or as a mixture with a fluxing oil, is intimately contacted with air or a gas containing free oxygen while being maintained at an elevated temperature by circulation from a bulk supply through a battery of externally heated tubes and back to the bulk supply.

In such operations substantial reductions in the period of blowing required to produce a desired asphalt may be accomplished by maintaining the temperature used at a relatively high value and by increasing the effective contact between the residuum and the air or oxygen-containing gas within the reaction zone. Effective contact between the residuum and the air or oxygen-containing gas may be increased by maintaining the residuum under a substantial atmospheric pressure in the reaction zone and by subdividing the residuum circulating from the bulk supply to the heating tubes into a plurality of streams flowing in parallel through the heating tubes and introducing the oxygen-containing gas, as a plurality of streams, into the plurality of streams of residuum passing through the heating tubes. In such operations too high a temperature within the reaction zone tends to impair the quality of the product. Accordingly, control of such an operation is quite critical because the heat generated by the reaction, which is liberated at a rate increasing as the temperature and effective contact are increased, necessitates a rather delicate balance between the maintenance of a temperature sufficiently high to permit a maximum reduction in the time of blowing consistent with the production of a good quality product, and a temperature so high as to permit the reaction to get beyond control. Moreover, the temperature must be controlled with respect to the entire bulk of residuum in the reaction zone.

The present invention provides an improved control of the temperature with respect to the entire body of residuum, to which the reaction responds with a minimum of delay and which at the same time is adapted to provide for as great a reduction in the time of blowing as is consistent with the production of a product of the desired quality. Moreover by this improved control economies in the amount of oxygen-containing gas required for the production of a given quality of product also may be accomplished.

According to the present invention the rate of introduction of air or other oxygen-containing gas to the heating tubes, or the oxygen content of such gas, is controlled with respect to the temperature of the reaction mixture flowing from the heating tubes to the bulk supply, while the application of external heat to the heating tubes, wherein the residuum being blown is heated to the desired temperature, is controlled with respect to the temperature of the residuum flowing to the heating tubes from the bulk supply. The first-mentioned control may be effected for example, by decreasing and increasing, respectively, the rate of introduction of air to the heating tubes as the temperature of the reaction mixture flowing from the heating tubes increases and decreases, or by increasing or decreasing, respectively, the rate of introduction of a diluent, such as steam, supplied to the heating tubes with the air as this temperature increases and decreases. The second-mentioned control may be effected, for example, by decreasing and increasing, respectively, the rate of combustion, in a furnace in which the heating tubes are positioned, as the temperature of the residuum passing from the heating tubes to the bulk supply increases and decreases, or by recirculating heating gases through the heating chamber and providing for dilution of such recirculated heating gases and by increasing and decreasing, respectively, such dilution as this temperature increases or decreases, or by combination of such control measures.

The temperature of the residuum passing from the bulk supply to the heating tubes varies with the temperature of the bulk supply irrespective of the temperature of the reaction mixture passing from the heating tubes to the bulk supply. Control of this temperature irrespective of the quantity or oxygen content of the gas introduced to the heating tubes under normal operating conditions permits the maintenance of conditions in the heating tubes most advantageous for economical use of the oxygen-containing gas supplied to the heating tubes. At the same time such control assists in protecting against overheating in the heating tubes or in the bulk supply. Control of the introduction of oxygen-containing gas to the heating tubes with respect to the temperature of reaction mixture leaving the heating tubes assists in preventing overheating of the reaction mixture in the heating tubes where the reaction rates normally are the highest and also assists in preventing overheating of the bulk supply.

The last-mentioned control, with reference to the temperature of the reaction mixture flowing from the heating tubes to the bulk supply, is not effective over as wide a range as the first-mentioned control. However, it is under normal operating conditions substantially independent of the temperature of the bulk supply and therefore it responds with a minimum of delay.

Figure 2:
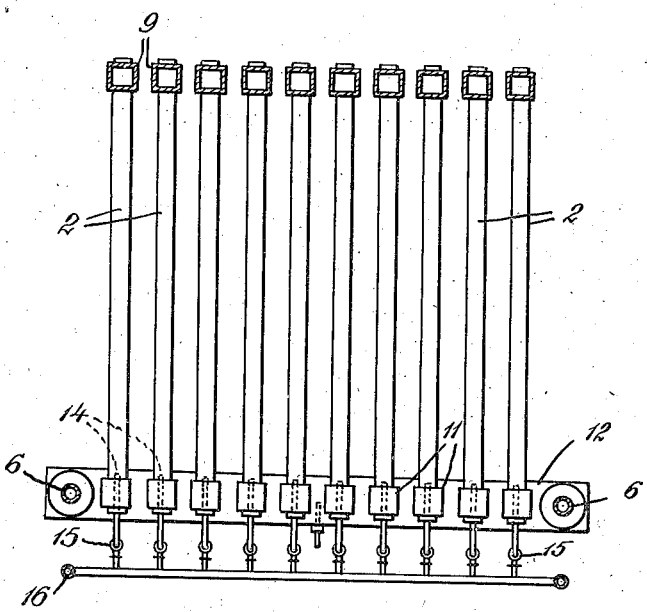
Figure 3:
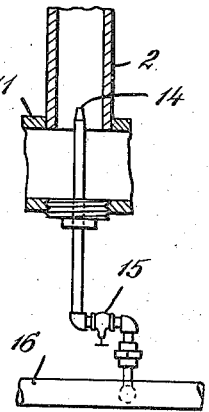
Figure 4:
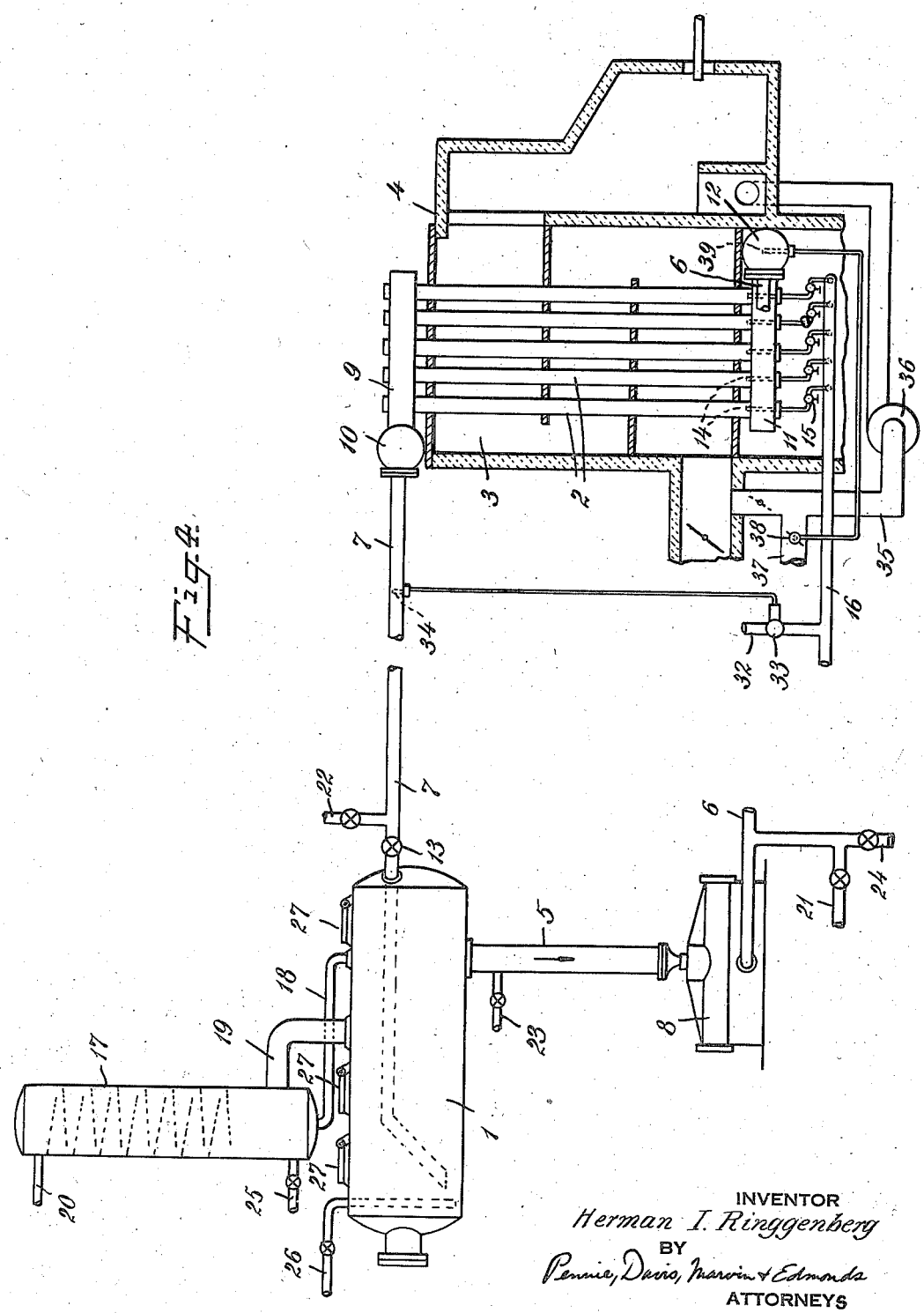

The invention will be further described in connection with the accompanying drawings which illustrate diagrammatically and conventionally apparatus embodying the invention and in which the process of the invention may be carried out. In the accompanying drawings, Fig. 1 is an elevation partly in section and with parts broken away of an apparatus embodying one form of the invention wherein the rate of supply of oxygen-containing gas to the heating tubes is controlled with reference to the temperature of the reaction mixture flowing from the heating tubes to the bulk supply, and in which the supply of fuel to the furnace wherein heat is externally applied to the heating tubes is controlled with reference to the temperature of the residuum flowing from the bulk supply to the heating tubes; Fig. 2 is a schematic elevation of the heating tubes forming part of the apparatus illustrated in Fig. 1 but normal to the elevation constituting Fig. 1; Fig. 3 is an enlarged fragmentary detail of the nozzles for introducing the oxygen-containing gas into the heating tubes illustrated in Figs. 1 and 2; and Fig. 4 is an elevation partly in section and with parts broken away of an apparatus embodying a modified form of the invention, wherein the introduction of a diluent to the oxygen-containing gas supplied to the heating tubes is controlled with reference to the temperature of the reaction mixture flowing from the heating tubes to the bulk supply, and the application of external heat to the heating tubes is controlled with reference to the temperature of the residuum flowing from the bulk supply to the heating tubes by varying the rate of introduction of a relatively cool diluent gas into a stream of flue gases being recirculated over the heating tubes.

The apparatus illustrated in Fig. 1 of the drawings comprises a bulk supply 1, a battery of heating tubes 2 arranged in the heating flue 3 of a furnace 4, and circulating connections 5, 6 and 7, including a circulating pump 8, connecting the battery of heating tubes through manifolds 9, 10, 11 and 12, with the bulk supply drum 1. The circulating pump 8 may be of any conventional type adapted to maintain the desired pressure within the heating tubes 2. For the maintenance of substantial superatmospheric pressures in the heating tubes 2, pumps of the type described in Letters Patent Nos. 1,701,166 and 1,701,198, granted to Sinclair Refining Company, February 5, 1929 on applications filed by Thomas De Colon Tifft, may be used with advantage. A valve 13 is provided in the circulating connection 7 to permit the maintenance of a pressure differential between the heating tubes 2 and the bulk supply drum 1, if desired. The battery of heating tubes comprises 10 rows of 5 tubes each, each row of tubes being connected at its upper end to a manifold 9 and at its lower end to a manifold 11, the several manifolds 9 being connected to a manifold 10 and the several manifolds 11 being connected to a manifold 12. Conventional explosion doors 27 are arranged in the upper part of the bulk supply drum 1.

The pump 8 is arranged to circulate petroleum residuum from the bulk supply drum 1 to the lower ends of the heating tubes 2 through connection 6, upwardly through the heating tubes 2 and back to the bulk supply drum 1 through connection 7. The connection 6 may consist of a pair of connections between the discharge of pump 8 and opposite ends of the manifold 12. Nozzles 14 extending through the manifolds 11, are arranged to discharge into the lower ends of each of the heating tubes 2. These nozzles are connected, through individual regulating valves 15 to a manifold 16 including a common control valve 29, through which air or other oxygen-containing gas is supplied under sufficient pressure to effect its introduction into the heating tubes 2 through the nozzles 14.

The reflux tower 17 is provided for refluxing to the bulk supply drum 1 through connection 18 any condensible components of the gas mixture separated from the petroleum residuum in the bulk supply drum 1 and escaping therefrom through connection 19 falling within the boiling range of any fluxing oil mixed with the petroleum residuum supplied to the apparatus. This reflux tower may, for example, be air cooled. The gas mixture escaping from the reflux tower 17 through connection 20 passes through a conventional condenser (not shown) for the recovery of further condensible components and thence to a conventional blow stack (not shown).

Connection 21 is provided for initially charging the apparatus at the beginning of an operation, batch or continuous, and for pumping out the apparatus at the end of an operation, and connections 22, 23 and 24 are provided for steaming out the apparatus at the end of an operation.

Connection 25 is provided for supplying petroleum residuum to the apparatus during operation. As illustrated, this connection is arranged to discharge into the bulk supply drum 1 through the lower end of the reflux tower 17 and connection 18; or it may be arranged to discharge directly into the bulk supply drum 1. Connection 26 is provided for discharging treated residuum from the apparatus during operation.

The common control valve 29 in the manifold 16, through which air is supplied to the heating tubes 2, is a diaphragm-operated valve that is controlled by a thermostat arranged in the circulating line 7 through which the reaction mixture from the heating tubes flows to the bulk supply. The arrangement is such that the valve 29 will open as the temperature of the reaction mixture in the circulating line 7 decreases and close as this temperature increases. The firebox in the furnace 4 is heated by a burner 30 to which fuel is supplied through the diaphragm-valve 31. Valve 31 is controlled by a thermostat positioned in the manifold 12 through which the residuum being treated flows from the bulk supply to the heating tubes 2. The arrangement is such that the valve 31 will open, so as to increase the rate of fuel supplied to the burner 30, as the temperature of the residuum in manifold 12 decreases, and close as this temperature increases.

The modified form of apparatus shown in Fig. 4 is generally similar to the form of apparatus shown in Fig. 1 and corresponding parts are identified by the same reference numerals. In the arrangement shown in Fig. 4 however, a branch connection 32 is arranged to supply a diluent gas, such as steam, to the manifold 16 through which the air or other gas containing free oxygen is supplied to the heating tubes 2. This branch connection 32 includes a diaphragm-operated valve 33 which is controlled by a thermostat 34 arranged in the circulating connection 7. The arrangement is such that the valve 33 will open, so as to increase the supply of diluent to the header 16, as the temperature of the reaction mixture flowing through the circulating line 7 increases, and close as this temperature decreases. The furnace, in the apparatus shown in Fig. 4, is provided with a duct 35 in which is interposed a fan 36. The fan 36 and duct 35 are arranged to withdraw flue gases which have passed over the heating tubes 2 from the stack flue and reintroduce the withdrawn flue gases into the fire-box of the furnace 4 so that they will be recirculated over the heating tubes 2. The duct 35 is provided with a branch duct 37 arranged to permit the introduction of a relatively cool diluent gas, such as fresh air, into the stream of flue gases which circulates through duct 35. Branch duct 37 is provided with a damper 38. The damper 38 is controlled by thermostat 39 positioned in the manifold 12, the arrangement being such that the damper 38 will open, so as to permit an increased amount of relatively cool diluent gas to enter the fire-box of the furnace 4, as the temperature of the residuum flowing through the manifold 12 increases, and close as this temperature decreases.

In carrying out the invention in the apparatus of the type illustrated, for example, the system is charged with an amount of petroleum residuum sufficient to fill the bulk supply drum 1 somewhat less than half full and to fill the heating tubes 2 and the circulating connections 5, 6 and 7. Circulation of the charge is started and the circulating charge is heated until the desired operating temperature, not exceeding about 500° F., is attained. The operation may be carried out, particularly where a substantial superatmospheric pressure is maintained within the heating tubes, at temperatures as low as 350° F.–400° F. The introduction of air through the several nozzles 14 then is begun, the temperature being maintained within the stated ranges by appropriate adjustment of the thermostat controls to prevent the maximum desired temperature being exceeded in the circulating connection through which the reaction mixture flows from the heating tubes to the bulk supply, and to maintain the residuum entering the heating tubes through manifold 12 at a temperature slightly lower than that prevailing at the outlet of the heating tubes but high enough to permit the reaction to proceed efficiently.

A pressure approximating atmospheric may be maintained in the bulk supply drum 1 and a pressure just enough higher to effect circulation through the heating tubes may be maintained on the discharge side of the circulating pump 8 during operation, or a pressure approximating atmospheric may be maintained in the bulk supply drum 1 and a substantial superatmospheric pressure, 100–200 pounds per square inch, for example, may be maintained between the discharge side of the circulating pump 8 and the control valve 13, that is, through the heating tubes 2, this pressure being reduced to that prevailing in the bulk supply drum 1 as the circulating residuum passes through the control valve 13. The gaseous products of the reaction separate from the circulating residuum in the bulk supply 1 and escape through connection 9. If the operation is being conducted as a batch operation, each individual batch is blown in this manner until an asphalt product of the desired quality is produced. This batch is then pumped out of the apparatus and another batch charged to the apparatus to be similarly treated. If the operation is being conducted on a continuous basis, untreated residuum is supplied to and treated residuum is withdrawn from the bulk supply drum as the operation proceeds; the rate of supply and withdrawal of residuum, that is the rate at which residuum passes through the operation, being regulated so that an asphalt product of the desired final quality or desired intermediate quality is produced within the meantime during which the residuum remains within the apparatus.

I claim:

1. In the manufacture of asphalt from petroleum residuum, the improvement which comprises circulating residuum from a bulk supply through a battery of heating tubes and back to the bulk supply, introducing a gas containing free oxygen into the residuum passing through the heating tubes, heating the residuum in the presence of the introduced gas to a temperature not exceeding about 500° F. during passage through the heating tubes by the application of heat externally to said heating tubes, controlling the introduction of free oxygen into the residuum passing through the heating tubes with reference to the temperature of the reaction mixture leaving said heating tubes by decreasing and increasing respectively the supply of oxygen as the temperature of the reaction mixture increases and decreases, and controlling the application of heat externally to said heating tubes with reference to the temperature of the residuum entering said heating tubes from the bulk supply by increasing and decreasing, respectively, such application of heat as the temperature of the residuum entering the heating tubes from the bulk supply decreases and increases.

2. In the manufacture of asphalt from petroleum residuum, the improvement which comprises circulating residuum from a bulk supply through a battery of heating tubes and back to the bulk supply, introducing a gas containing free oxygen into the residuum passing through the heating tubes, heating the residuum in the presence of the introduced gas to a temperature not exceeding about 500° F. during passage through the heating tubes by the application of heat externally to said heating tubes, controlling the rate of supply of said gas containing free oxygen to the residuum passing through the heating tubes with reference to the temperature of the mixture leaving said heating tubes by decreasing and increasing, respectively, the rate of supply of oxygen containing gas as the temperature of the mixture increases and decreases, and controlling the application of heat externally to said heating tubes with reference to the temperature of the residuum entering said heating tubes from the bulk supply by increasing and decreasing, respectively, such application of heat as the temperature of the residuum entering the heating tubes from the bulk supply decreases and increases.

3. In the manufacture of asphalt from petroleum residuum, the improvement which comprises circulating residuum from a bulk supply through a battery of heating tubes and back to the bulk supply, supplying a stream of gas containing free oxygen to the residuum passing through the heating tubes, heating the residuum in the presence of the introduced gas to a temperature not exceeding about 500° F. during passage through the heating tubes by the application of the heat externally to said heating tubes, introducing a diluent gas into the said stream of gas containing free oxygen being supplied to the residuum passing through the heating tubes, controlling the rate of introduction of said diluent gas with reference to the temperature of the mixture leaving said heating tubes by decreasing and increasing, respectively, the rate of introduction of said diluent gas as the temperature of the reaction mixture leaving the heating tubes decreases and increases, and controlling the application of heat externally to said heating tubes with reference to the temperature of the residuum entering said heating tubes from the bulk supply by increasing and decreasing, respectively, such application of heat as the temperature of the residuum entering the heating tubes from the bulk supply decreases and increases.

4. In combination in apparatus for the manufacture of asphalt, a bulk supply drum, a battery of heating tubes, circulating connections leading from the outlet end of the battery of heating tubes to the bulk supply drum and from the bulk supply drum to the inlet end of the battery of heating tubes, means for introducing a gas containing free oxygen to the inlet end of said heating tubes, means for applying heat externally to said heating tubes, means responsive to the temperature within the circulating line leading to the bulk supply tank from the heating tubes for increasing and decreasing, respectively, the rate of introduction of oxygen-containing gas to the inlet of the heating tubes as this temperature decreases and increases, and means responsive to the temperature within the circulating line leading from the bulk supply drum to the heating tubes for increasing and decreasing, respectively, the application of heat externally to said heating tubes as the last-mentioned temperature decreases and increases.

5. In combination in apparatus for the manufacture of asphalt, a bulk supply drum, a battery of heating tubes, circulating connections leading from the outlet end of the battery of heating tubes to the bulk supply drum and from the bulk supply drum to the inlet end of the battery of heating tubes, means for supplying a stream of gas containing free oxygen to the inlet end of said heating tubes, means for introducing a diluent gas into said means for supplying oxygen-containing gas to the inlet end of said heating tubes, means for applying heat externally to said heating tubes, means responsive to the temperature within the circulating line leading to the bulk supply drum from the heating tubes for increasing and decreasing respectively, the rate of introduction of said diluent gas into the stream of oxygen-containing gas being supplied to the heating tubes as this temperature increases and decreases, and means responsive to the temperature within the circulating line leading from the bulk supply drum to the heating tubes for increasing and decreasing respectively the application of heat externally to said heating tubes.

HERMAN I. RINGGENBERG.